United States Patent [19]

Karlen

[11] 4,187,238
[45] Feb. 5, 1980

[54] ANTHRAQUINONE DISPERSE DYES

[75] Inventor: Urs Karlen, Magden, Switzerland

[73] Assignee: Ciba-Geigy Corporation, Ardsley, N.Y.

[21] Appl. No.: 935,394

[22] Filed: Aug. 21, 1978

Related U.S. Application Data

[63] Continuation of Ser. No. 842,188, Oct. 14, 1977, abandoned, which is a continuation of Ser. No. 705,850, Jul. 16, 1976, abandoned.

[51] Int. Cl.$^2$ .............................................. C07C 49/68
[52] U.S. Cl. .............................. 260/376; 260/326.5 E; 260/377; 546/245
[58] Field of Search ....................................... 260/376

[56] References Cited

U.S. PATENT DOCUMENTS 2,823,212  2/1958  Anton et al. .......................... 260/376
3,734,934  5/1973  Kolliker et al. ....................... 260/376

FOREIGN PATENT DOCUMENTS 1516828  2/1968  France ................................... 260/376

Primary Examiner—John Doll

Attorney, Agent, or Firm—Prabodh I. Almaula

[57] ABSTRACT

Disperse dyes of the formula (I)

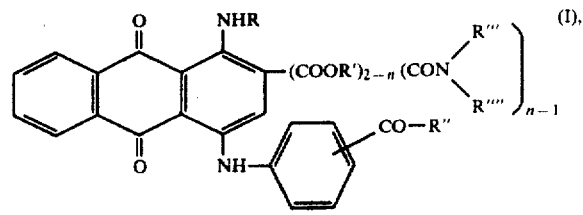

wherein R represents substituted or unsubstituted alkyl, cycloalkyl or hydrogen, R' represents substituted or unsubstituted alkyl, cycloalkyl, aralkyl or phenyl, and R" represents a radical of the formulae —NR'''R'''' or —OX, wherein X represents substituted or unsubstituted alkyl, cycloalkyl, aralkyl or phenyl and R''' and R'''' each represent hydrogen or substituted or unsubstituted alkyl radicals which, together with the nitrogen atom to which they are attached, are also able to form a 5- or 6-membered ring, and n is 1 or 2. The new dyestuffs give fast blue shades on polyester fabric.

8 Claims, No Drawings

ANTHRAQUINONE DISPERSE DYES

This is a continuation of application Ser. No. 842,188, filed on Oct. 14, 1977, which is a continuation of application Ser. No. 705,850, filed, July 16, 1976, both now abandoned.

The invention provides new disperse dyes of the formula (I)

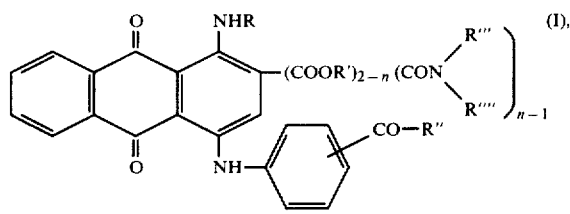

wherein R represents substituted or unsubstituted alkyl, cycloalkyl or hydrogen. R' represents or unsubstituted alkyl, cycloalkyl, aralkyl or phenyl, and R" represents a radical of the formula —NR'"R"" or —OX, wherein X represents substituted or unsubstituted alkyl, cycloalkyl, aralkyl or phenyl and R'" and R""each represent hydrogen or substituted or unsubstituted alkyl radicals which, together with the nitrogen atom to which they are attached, are also able to form a 5- or 6-membered ring, and n is 1 or 2.

The dyes of this invention are obtained by reacting anthraquinone-2-carboxylic acid esters of the formula

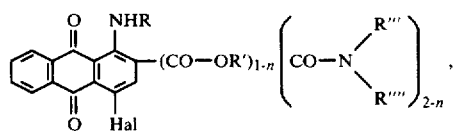

wherein R and R' are as defined hereinabove and Hal represents chlorine or bromine, with an aminobenzoic acid ester or amide of the formula

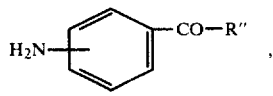

wherein R" has the meaning assigned to it hereinbefore.

Preferred compounds are those of the formula

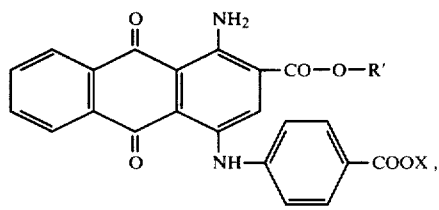

wherein R' and X are as defined hereinbefore.

In addition to hydrogen, suitable radicals R are cycloalkyl groups, such as cyclohexyl and cyclopentyl, and lower alkyl groups, such as methyl, ethyl, propyl, butyl and pentyl groups, which can be substituted by chlorine, bromine, hydroxyl, cyano, lower alkoxy (methoxy, ethoxy, propyloxy, butoxy), phenyl (for example nitrophenyl, chlorophenyl, bromophenyl, cyanophenyl, toluyl, cresyl, methoxyphenyl and ethoxyphenyl) or lower alkylcarbonyloxy (acetoxy, formyloxy, propionyloxy).

Suitable groups R' and X are lower alkyl radicals, such as methyl, ethyl, propyl, butyl or pentyl, which can be substituted, for example by chlorine, bromine, fluorine, hydroxyl, cyano, lower alkoxy (methoxy, ethoxy, propoxy, butoxy), phenyl, cyanoethoxy, lower alkylcarbonyloxy (acetoxy, formyloxy, propionyloxy), lower alkoxycarbonyl (carbomethoxy, carboethoxy, carbopropoxy), and lower alkylcarbonyloxy (acetoxy, propionyloxy, formyloxy); phenyl, phenylazo; cycloalkyl groups, such as cyclohexyl and cyclopentyl; and aralkyl groups, such as benzyl, chlorobenzyl, nitrobenzyl and phenylethyl. The term "lower" means a carbon contents up to 5 carbon atoms.

Suitable radicals R'" and R"" are, besides hydrogen, lower alkyl groups, such as methyl, ethyl, propyl, butyl and pentyl groups, which can be substituted by chlorine, bromine, hydroxyl, cyano, lower alkoxy (methoxy, ethoxy, proploxy, butoxy), or together they form radicals of the formulae

—CH$_2$CH$_2$CH$_2$CH$_2$—, —CH$_2$CH$_2$CH$_2$CH$_2$CH$_2$CH$_2$—,

—CH$_2$CH$_2$—O—CH$_2$CH$_2$—, —CH$_2$CH$_2$—S—CH$_2$CH$_2$—,

—CH$_2$CH$_2$—N—CH$_2$CH$_2$—, —CH$_2$CH$_2$—NH—CH$_2$—CH$_2$—,
$\quad\quad\quad\quad\;\;|$
$\quad\quad\quad\;\;$CH$_3$ —CH$_2$CH$_2$—N—CH$_2$CH$_2$—, or —CH$_2$CH$_2$—N—CH$_2$CH$_2$—,
$\quad\quad\quad\quad\;\;|$ $\quad\quad\quad\quad\quad\quad\quad\quad\;\;|$
$\quad\quad\quad\;\;$COCH$_3$ $\quad\quad\quad\quad\quad\quad\quad\;\;$HCO The reaction of the present invention of 1-amino (or 1-alkylamino)-4-(chloro-or bromo)-anthraquinone-2-carboxylic acid esters or amides with aminobenzoic acid esters to give the dyes of this invention is carried out at 50° to 250° C., preferably at 80° to 180° C., in an inert solvent, such as nitrobenzene, diethylene glycol monomethyl ether, toluene, xylene, tetraline etc.

The reaction of the aminobenzoic acid esters with the 4-chloro- or 4-bromcanthraquinones takes place advantageously in the presence of an acid acceptor, such as an alkali hydroxide, carbonate or acetate, such as sodium or potassium hydroxide, sodium or potassium carbonate and sodium or potassium acetate, and of a catalyst, such as a copper metal and copper (I) salt, for example copper (I) acetate or copper (I) chloride.

It is also possible to obtain the dyes of this invention by reacting a 4-aminoanthraquinone of the formula

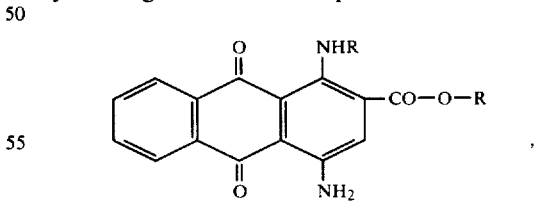

wherein R and R' are as defined hereinbefore, with a bromobenzoic acid ester, advantageously with heating in an inert solvent, such as nitrobenzene, xylene etc., to 80° to 250° C.

A shorter route to obtaining the dyes of the present invention consists in reacting 1-amino-2,4-dichloroanthraquinone in a first step in 4-position with aminobenzoic acid, then in 2-position replacing the chlorine atom by the cyano group by treatment with potassium cyanide, saponifying the cyano group by way of the amide to give the carboxyl group, and subsequently esterifying the free carboxyl groups with an alcohol R'OH, wherein R' has the meaning assigned to it in formula (I). By discontinuing the saponification of the amide, compounds are obtained in which n=1.

A particularly suitable starting material is bromamine acid, which is initially reacted at the bromine atom with aminobenzoic acids. The 2-sulpho group is subsequently replaced by cyanides (KCN) and hydrolysed, to yield 1-amino-4-carboxyphenylamino-anthraquinone-2-carboxylic acid, which is then esterified.

The water-insoluble compounds of the present invention are disperse dyes. They themselves, mixtures thereof or mixtures thereof with other disperse dyes are particularly suitable for dyeing and printing regenerated man-made and synthetic man-made fibres, for example acrylic or acrylonitrile fibres, polyacrylonitrile fibres and fibres of copolymers of acrylonitrile and other vinyl compounds, for example acrylic esters, acrylic amides, vinyl pyridine, vinyl chloride or vinylidene chloride, fibres of copolymers of dicyanmethylene and vinyl acetate and of acrylonitrile block co-polymers, fibres of polyurethanes, basically modified polyolefins, for example polypropylene, cellulose to iacetate and cellulose 2½-acetate, polyamides, for example nylon 6, nylon 66 or nylon 12, and in particular fibres of aromatic polyesters, for example those obtained from terephthalic acid and ethylene glycol or 1,4-dimethylcyclohexane, and fibres of copolymers of terephthalic acid and isoterephthalic acid and ethylene glycol.

For dyeing from aqueous liquors, the compounds are advantageously used in finely dispersed form, the dyeing being carried out in the presence of dispersants, for example cellulose sulphite lye, or of synthetic detergents or in the presence of a combination of different wetting agents and dispersants. As a rule it is advisable to convert the dyes before dyeing into a dyeing preparation which contains a dispersant and the finely divided dye in such a form that a fine dispersion is formed when the dyestuff preparations are diluted with water. Such dyestuff preparations can be obtained in known manner by grinding the dry or wet dye with or without the addition of dispersants.

After the wet grinding, subsequent drying yields dyestuff batches which contain textile assistants and 5 to 95% of dye. Examples of dispersants of the non-ionic group that can be used with advantage are: addition products of 8 moles of ethylene oxide with 1 mole of p-tert.-octyl-phenyl, of 15 or 6 moles of ethylene oxide with castor oil, of 20 moles of ethylene oxide with the alcohol $C_{16}H_{33}OH$, ethylene oxide addition products with di-[α-phenylethyl]phenols, polyethylene oxide-tert.-dodecyl-thioether, polyamine-polyglycol ether or addition products of 15 or 30 moles of ethylene oxide with 1 mole of the amine $C_{12}H_{25}NH_2$ or $C_{18}H_{37}NH_2$.

As anionic dispersants there may be mentioned: sulphuric acid esters of alcohols of the fatty series containing 8 to 20 carbon atoms, of the ethylenoxy adducts of the corresponding fatty acid amides, or of alkylated phenols containing 8 to 12 carbon atoms in the alkyl moiety: sulphonic acid esters with alkyl radicals containing 8 to 20 carbon atoms; sulphation products of unsaturated fats and oils; phosphoric acid esters containing 8 to 20 carbon atoms; fatty acid soaps, also allylaryl sulphonates, condensation products of formaldehyde with naphthalene-sulphonic acid and lignin sulphonates.

Suitable cationic dispersants are quaternary ammonium compounds that contain alkyl or aralkyl radicals of 8 to 20 carbon atoms.

Instead of containing the dispersants, the dyestuff preparations can also contain organic solvents, especially solvents that boil above 100° C., which are preferably miscible with water, such as mono- and dialkylglycol ethers dioxan, dimethyl formamide or dimethyl acetamide, tetramethylenesulphone or dimethyl sulphoxide. Dye, dispersant and solvent can with advantage be ground together.

To obtain strong dyeings on polyethylene terephthalate fibres from an aqueous dye liquor it is appropriate to add a swelling agent to the dye liquor or to carry out the dyeing procedure under pressure at a temperature above 100° C. Suitable swelling agents are aromatic carboxylic acids, phenols, aromatic halogen compounds or diphenyl.

The heat fixation of the dye is effected by heating the padded polyester fabric, advantageously after drying it, for example in steam or warm air, to temperatures above 100° C., for example to temperatures between 180° C. and 210° C.

The dyeings obtained according to this invention can be subjected to an aftertreatment, for example by heating with an aqueous solution of a non-ionic detergent. The compounds can also be applied according to the invention by printing instead of by impregnation. To this end a printing paste is used which contains the finely divided dye and the assistants customarily used in printing, for example wetting agents and thickeners and, if appropriate, an alkali. According to the invention, strong prints with good fastness properties are obtained.

Cellulose 2½-acetate fibres are dyed preferably at temperatures of 80° to 85° C., whereas cellulose triacetate fibres are advantageously dyed at the boiling point of the dye liquor. The use of dyestuff carriers or swelling agents is superfluous when dyeing cellulose 2½-acetate or polyamide fibres.

Synthetic man-made fibres, in particular polyester and polyamide fibres, can also be dyed for example in an organic solvent bath, such as in perchloroethylene or a perchloroethylene/water emulsion, or by the "Dybln process", as described for example hereinafter. The method of dyeing is not, however, restricted to that described.

A printing paste is obtained by stirring 10 parts of dyestuff paste of 5% concentration into a stock thickener which contains 80 parts of an emulsion thickener and 10 parts of polyethylene glycol 400. The polyester/cotton mixture (66:33) is printed with this paste, dried at 70° to 80° C. and thermofixed for 30 seconds at 200° C. It is then washed with cold water and subjected to a treatment with soap.

According to the above described processes, strong dyeings and prints with good colour fastness properties are obtained, in particular fastness to thermofixation, sublimation, pleating, exhaust gases, cross-dyeing, dry cleaning and chlorine and good wetfastness properties, for example fastness to water, sea water, washing and perspiration.

The dyes have a good fibre affinity and a good exhaustion capacity. The dyeings are fast to lubricants, ozone, burnt gases, rubbing and solvents, and the reserve of wool and cotton and the high temperature resistance are good. The dischargeability and resistance to reduction (in the dyeing of wool) are good. The pH resistance is also good.

It is also possible to use the water-insoluble dyes of the present invention for the spin dyeing of polyamides, polyesters and polyolefins. The polymers to be dyed are advantageously mixed in the form of powder, grains or flakes, as they emerge from the spinning solution, coloured or in the fused state, with the dye, which is introduced in the dry state or in the form of a dispersion or a solution in a solvent which can be volatile. After the dye has been uniformly dispersed in the solution or melt of the polymer, the admixture can be processed in known manner to fibres, yarns, monofilaments, films and the like by pouring, moulding or extrusion.

The invention is illustrated by the following Examples, in which the parts and percentages are by weight unless otherwise indicated.

EXAMPLE 1

25 parts of p-aminobenzoic acid ethyl ester are fused at 100° C. and subsequently 3.88 parts of 1-amino-4-bromoanthraquinone-2-carboxylic acid-n-propyl ester, 1.33 parts of potassium acetate and 0.008 part of copper (I) chloride are added. After the temperature has been raised to 135° C. the reaction mixture is stirred for 32 hours. After this time the reaction mixture is cooled to app. 80° C. and treated with 60 ml of methanol. Stirring is continued for a further 30 minutes at the boil and the precipitate is thereafter filtered off hot, washed with 250 ml of methanol and 300 ml of hot water and dried, to yield 3.5 parts of the dye of the following constitution When applied as a disperse dye to polyester fibres by the conventional dyeing procedures, greenish-blue dyeings of good fastness properties are obtained.

By proceeding in a manner analogous to that described above, but using the starting materials listed in Table 1 instead of those used in this Example, the corresponding disperse dyes are obtained, which give greenish-blue shades on polyester fabric.

Table 1

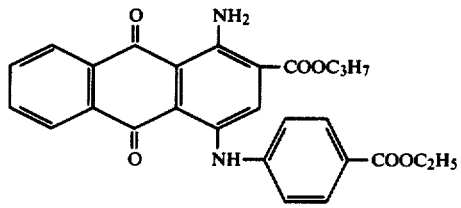

| No. | $R_1$ | $R_2$ |
|---|---|---|
| 1 | $CH_3$ | $CH_3$ |
| 2 | " | $C_2H_5$ |
| 3 | " | $n-C_3H_7$ |
| 4 | " | $n-C_4H_9$ |
| 5 | $CH(CH_3)CH_2OCH_3$ | $C_2H_5$ |
| 6 | " | $i-C_3H_7$ |
| 7 | " | $i-C_4H_9$ |
| 8 | $i-C_3H_7$ | $n-C_3H_7$ |

Table 1-continued

| No. | $R_1$ | $R_2$ |
|---|---|---|
| 9 | $i-C_3H_7$ | $i-C_3H_7$ |
| 10 | $i-C_4H_9$ | $i-C_4H_9$ |
| 11 | $C_2H_4OH$ | $CH_3$ |
| 12 | " | $n-C_4H_9$ |
| 13 | $C_2H_5$ \| $CH_2CCH_2OH$ \| $C_4H_9$ | $CH_3$ |
| 14 | " | $n-C_4H_9$ |
| 15 | " | $i-C_4H_9$ |
| 16 | $i-C_3H_7$ | $C_2H_5$ |
| 17 | $n-C_3H_7$ | $n-C_4H_9$ |

EXAMPLE 2

7.48 g of 1-amino-4-bromoanthraquinone-2-carboxylic acid ethyl ester, 2.66 g of potassium acetate and 0.012 g of copper (I) chloride are suspended in 40 ml of anthranilic acid ethyl ester. The temperature is thereafter adjusted to 135° C. and the reaction is carried out at this temperature for 90 minutes. While the reaction mixture is cooling, it is treated at 90° C. with 50 ml of methanol and 50 ml of water. After the solution has further cooled to room temperature it is filtered and the filter residue is washed with 150 ml of methanol and 400 ml of hot water and dried, to yield 5.2 g of the dye of the following constitution

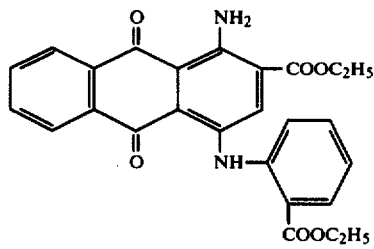

Table 2 lists further disperse dyes which are obtained in a manner analogous that described in Example 2 using the corresponding starting materials. All these disperse dyes give greenish-blue dyeings of good fastness properties on polyester fabric.

Table 2

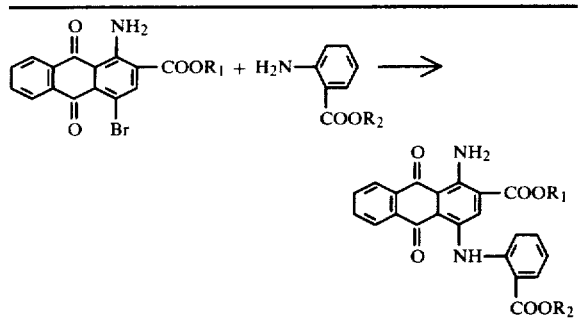

| No. | R₁ | R₂ |
|---|---|---|
| 1 | $C_2H_5$ | $CH_3$ |
| 2 | " | $n\text{-}C_3H_7$ |
| 3 | " | $n\text{-}C_4H_9$ |
| 4 | " | $i\text{-}C_4H_9$ |
| 5 | $CH_3$ | $CH_3$ |
| 6 | " | $C_2H_5$ |
| 7 | " | $n\text{-}C_4H_9$ |
| 8 | $n\text{-}C_3H_7$ | $CH_3$ |
| 9 | " | $C_2H_5$ |
| 10 | " | $i\text{-}C_4H_9$ |
| 11 | $C_2H_4OH$ | $CH_3$ |
| 12 | " | $n\text{-}C_3H_7$ |
| 13 | " | $i\text{-}C_3H_7$ |
| 14 | $i\text{-}C_4H_9$ | $CH_3$ |
| 15 | " | $C_2H_5$ |

EXAMPLE 3

By using a mixture of p-aminobenzoic acid methyl ester and p-aminobenzoic acid butyl ester and otherwise proceeding in a manner similar to that described in Example 1, a dyestuff mixture of the formula

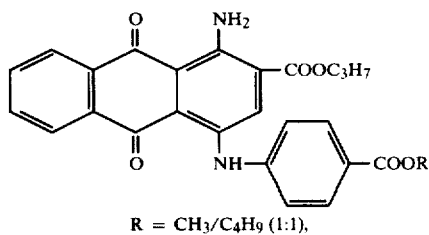

$R = CH_3/C_4H_9$ (1:1), is obtained, which colours polyester fabric in greenish-blue shades with good fastness properties.

Amine mixtures were also used resulting in dyestuff mixtures which correspond to the following particulars (the numbers refer to Table 1):

| Dyes of Table 1 | Ratio (weight) |
|---|---|
| No. 16 and No. 17 | 50 : 50 |
| No. 16 and No. 1 | 40 : 60 |
| No. 17 and No. 8 | 70 : 30 |
| No. 5 and No. 1 | 50 : 50 |
| No. 5 and No. 8 | 70 : 30 |

Good greenish-blue shades on polyester fabric are also obtained with these dyestuff mixtures.

Similar mixtures are obtained by mixing the dyes of Table 1 with those of Table 2, for example dye No. 5 (Table 2) with dye No. 1 (Table 1).

Dyeing Procedure (Thermofix Process)

20 parts of the dye of Example 1 are ground with 140 parts of water which contains 40 parts of sodium dinaphthylmethanedisulphonate.

A padding liquor is prepared from 200 parts of this dyestuff preparation, 100 parts of carboxymethyl cellulose (in the form of a 4% aqueous solution) and 700 parts of water by stirring the dyestuff preparation into the prediluted thickener with the aid of an impeller and subsequently adjusting the mixture to a pH value of 6 with 80% acetic acid. The polyester fabric is padded with this liquor at 30° C., squeezed out to a pick-up of 60% and thereafter dried at 70° to 80° C. The fabric is then heated for 60 second to 210° C. on a stenter frame and subsequently washed hot and rinsed thoroughly with cold water, to give a greenish-blue coloured fabric with good fastness properties.

Dyeing Procedure (High Temperature Process)

1 part of the dye obtained in Example 1 is ground with 2 parts of a 50% aqueous solution of the sodium salt of dinaphthylmethanedisulphonic acid and the dyestuff preparation obtained is dried.

This dyestuff preparation is stirred with 40 parts of a 10% aqueous solution of the sodium salt of N-benzyl-α-heptadecyl-benzimidazole-disulphonic acid and treated with 4 parts of a 40% acetic acid solution. Thereafter 4000 parts of a dye liquor are prepared by dilution with water.

Then 100 parts of cleansed polyethylene terephthalate fibrous material are put into this bath at 50° C. The temperature is raised in the course of half an hour to 120° C. to 130° C. and dyeing is carried out for 1 hour at this temperature is a closed vessel. A greenish-blue dyeing of excellent fastness to light and sublimation is obtained.

Unless indicated to the contrary, the shades indicated in the Examples are obtained using the HT process.

I claim:

1. Disperse dyes of the formula (I)

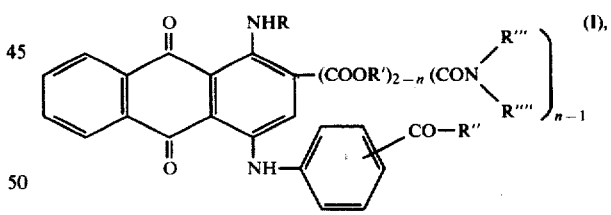

wherein R represents substituted or unsubstituted alkyl, cycloalkyl or hydrogen, R' represents substituted or unsubstituted alkyl, cycloalkyl, aralkyl or phenyl, and R" represents a radical of the formula —OX, wherein X represents substituted or unsubstituted alkyl, cycloalkyl, aralkyl or phenyl and n is 1.

2. A disperse dye as claimed in claim 1, wherein R represents alkyl or alkyl substituted by chlorine, bromine, hydroxyl, cyano, lower alkoxy, nitrophenyl, chlorophenyl, bromophenyl, cyanophenyl, toluyl, cresyl, methoxyphenyl and ethoxyphenyl or lower alkylcarbonyloxy, cyclohexyl or hydrogen, R' represents substituted or unsubstituted lower alkyl, cyclohexyl, $C_7$-$C_8$-aralkyl, phenyl, chlorophenyl, toluyl or nitrophenyl, R" represents a radical of the formulae —OX, wherein X represents substituted or unsubstituted lower alkyl, cyclohexyl, C₇-C₈-aralkyl, phenyl, chlorophenyl, toluyl, nitrophenyl, and n is 1.

3. A dye according to claim 1, wherein R is a hydrogen.

4. A dye according to claim 1 of the formula

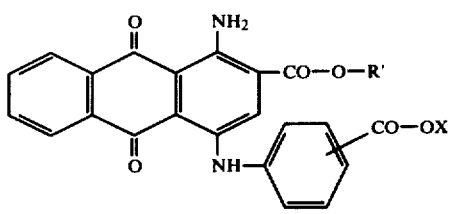

wherein R' and X have the meaning given in claim 1.

5. A dye according to claim 4, wherein R' and X are lower alkyl or lower alkyl substituted by lower alkyl, chlorine bromine, fluorine, hydroxy, cyano, lower alkoxy, phenyl, nitrophenyl, chlorophenyl, cyanoethoxy, lower-alkylcarbonyloxy, or lower-alkoxycarbonyl.

6. A dyestuff according to claim 5 of the formula

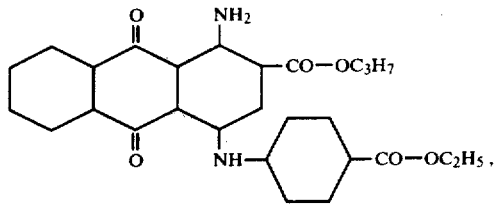

7. A dyestuff according to claim 5 of the formula

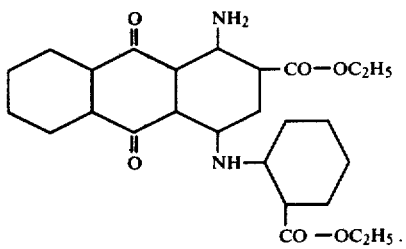

8. A dyestuff according to claim 5 of the formula

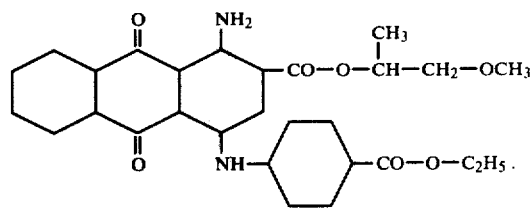

* * * * *